United States Patent Office 3,399,030
Patented Aug. 27, 1968

3,399,030
PROCESS FOR SEPARATING STRONTIUM FROM FISSION PRODUCT SOLUTION BY FIXING ON ANTIMONIC ACID
Charles Aubertin, Bois Colombes, Jean Lefebvre, Bourg-la-Reine, Gerard Galaud, Courbevoie, and Jacques Prospert, Massy, France, assignors to Commissariat à l'Energie Atomique, Paris, France
No Drawing. Filed Dec. 21, 1966, Ser. No. 603,162
Claims priority, application France, Jan. 5, 1966, 44,937; Nov. 30, 1966, 85,696
5 Claims. (Cl. 23—102)

ABSTRACT OF THE DISCLOSURE

Strontium is obtained from acid solutions of fission products by contacting the solution with antimonic acid and eluting the strontium fixed on the antimonic acid with a solution containing a cation of lead or silver.

---

The present invention is directed to a process for separating strontium values from a complex solution. This process is primarily applicable, although not exclusively so, to the recovery of strontium-90 which is present n waste solutions of fission products derived from plants for reprocessing irradiated nuclear fuels.

The waste solutions referred-to consist of a mixture of ions in nitric acid solution. However, the process according to the invention is also applicable to any other mixture which may contain strontium in the dissolved state. The process extends, for example, to hydrochloric acid solutions. Similarly, the solution is not necessarily an acid solution but may be either a neutral or weakly basic solution inasmuch as strontium-90 precipitates above a pH of 9 approximately. The method which is proposed for recovering the strontium values contained in such solutions makes use of an exchange of ions on antimonic acid. The properties of this ion exchanger with respect to strontium have already been demonstrated. However, no satisfactory method has been proposed up to the present time for recovering strontium which is fixed on antimonic acid.

The present invention is directed to a process for separating strontium values from a complex solution and especially an acid solution of fission products, said process being essentially characterized in that it comprises contacting the solution to be processed with an ion exchanger consisting of antimonic acid and eluting the strontium values which are fixed on the antimonic acid with a solution containing a cation which has a greater affinity for antimonic acid.

The antimonic acid which is employed as ion exchanger can be prepared according to any known method and especially by hydrolysis of antimony pentachloride; this method makes it possible to obtain products of reproducible quality.

According to a particular mode of execution of the process which forms the subject of this invention, the solution employed for displacing the strontium values which are fixed on the antimonic acid is a silver nitrate solution having a concentration within the range of 0.05 M to 1 M, and preferably 0.1 M to 0.5 M. It has been found that, by increasing the acid strength of the silver nitrate solution, the elution rate is similarly increased. It is preferable to select a nitric acid concentration which is higher than 1 N and preferably of the order of 2 N since, above this value, there is a practically negligible increase in the elution rate. However, solutions having a concentration of less than 1 N are liable to displace strontium values, the stability of silver nitrate being nevertheless better in an acid medium.

It is then possible to separate the strontium values from the eluate by one of the conventional techniques. In particular, strontium values can be precipitated in the form of carbonate or sulphate, for example, whilst the silver and the other ions remain in solution. The silver may also be separated-out by electrolysis in order to recover strontium in the dissolved state.

According to a secondary feature of the invention, the process comprises regeneration of the ion exchanger by washing with a nitric acid solution having a concentration which is higher than 2 N. The chemical strength of antimonic acid makes it possible to utilize nitric acid concentrations of at least 6 N without either degradation or loss of capacity. However, the economic optimum appears to be of the order of 5 N inasmuch as higher concentrations are not attended by any marked improvement in the regeneration factor.

Although it appears particularly advantageous to make use of nitric acid, it would also be possible without thereby departing from the scope of the invention to regenerate the ion exchanger by means of any other silver extractant. Thus, solutions of potassium thiocyanate in a nitric acid medium have been employed to elute quantitatively the silver which is fixed on antimonic acid, the concentration of silver in the eluate being constant and close to that which corresponds to the product of solubility of silver thiocyanate.

According to another mode of execution of the process according to the invention, the elution of strontium values which are fixed on antimonic acid is effected by a lead salt solution.

Either lead acetate or lead nitrate can be employed in particular as lead salt. Elution is performed, for example, by means of a lead nitrate solution having an acid strength within the range of 0 to 3 N and preferably of the order of 2 N. The lead nitrate concentration is advantageously within the range of 0.05 M to 1 M and preferably 0.1 M to 0.5 M in order to avoid any danger of precipitation.

Lead has an advantage over silver in that it is lower in cost price and its salts have higher stability. Furthermore, the regeneration of the exchanger by nitric acid is easier after elution with a lead salt than after elution with a silver salt: for a same final regeneration factor, regeneration of the exchanger can be performed with a solution having a lower acid strength and the quantity which is necessary is distinctly smaller.

There will now be described hereunder examples of execution of the process according to the invention as applied to the recovery of strontium values contained in a solution of fission products in a nitric acid medium.

Example 1

The cation which was chosen for displacing strontium values fixed on antimonic acid was silver, the affinity of which for antimonic acid is greater than that of strontium.

of successive fixation-elution cycles are recorded in Table I below:

TABLE I

| Cycle | 1 | 2 | 3 | 4 | 5 | 6 | 7 |
|---|---|---|---|---|---|---|---|
| Fixation: | | | | | | | |
| Temperature, °C | 20 | 60 | 60 | 60 | 60 | 60 | 60 |
| Throughput—Volumes of column per hour | 0.89 | 0.82 | 0.54 | 0.94 | 0.88 | 0.92 | |
| Volume passed—Volumes of column | 61.2 | 57.2 | 36.2 | 67.3 | 80.2 | 83.6 | 102.4 |
| Sr fixed, mg./ml | 2.0 | 2.4 | 1.2 | 1.6 | 1.5 | 1.4 | 1.6 |
| Sr total, mg./ml | 2.0 | 2.6 | 2.1 | 2.2 | 1.8 | 1.4 | 1.6 |
| Elution: | | | | | | | |
| Temperature, °C | 20 Then 60 | 60 | 60 | 60 Then 90 | 90 | 90 | 90 |
| Throughput—Volumes of column per hour | 1.0 | 0.87 | 0.69 | | 0.76 | 0.86 | 0.94 |
| Volume passed—Volumes of column | 116.2 | 45.1 | 66.0 | 66.0 | 57.4 | 60.7 | 62.2 |
| Sr eluted/Sr fixed, percent | 88.5 | 68.9 | 133.0 | 123.0 | 117.2 | 99.3 | 100 |
| Sr eluted/Sr total, percent | 88.5 | 62.5 | 71.4 | 88.5 | 100 | 99.3 | 100 |

The solution of processed fission products had the following composition:

|  | G./l. |
|---|---|
| Uranium | 0.2 |
| Iron | 3.3 |
| Nickel | 0.8 |
| Chromium | 0.95 |
| Aluminum | 6 |
| Molybdenum | 0.5 |
| Phosphate in $PO_4$ | 0.9 |
| Magnesium | 15 |
| Sodium | 12 |
| Calcium | 0.6 |
| Cerium | 0.44 |
| Lanthanum | 1.1 |
| Strontium | 0.15 |
| Acidity in $HNO_3$ | 2 N |

The antimonic acid which was employed as ion exchanger and prepared by hydrolysis of antimony pentachloride had the following properties:

| Apparent density | g./ml | 1 |
|---|---|---|
| Maximum capacity | meq./g | 5 |
| Maximum capacity in a 2 N acid medium | meq./g | 1.0 |
| Useful capacity in an acid solution of fission products | meq./g | 0.05 |

By causing the solution of fission products to percolate through a column which was loaded with antimonic acid and which had the following characteristics:

| Height of column H | cm | 7.6 |
|---|---|---|
| Cross-sectional area S | cm.² | 1.33 |
| Weight M | grs | 10 | there was obtained a strontium-fixation capacity of 2.0 mg./g. corresponding to a throughput of approximately 1 volume of column per hour and at ordinary temperature.

After having washed the column with $HNO_3$ of 2 N concentration, the strontium was eluted with a solution of 0.1 M $AgNO_3$ in 2 N $HND_3$. By operating at a temperature of 60° C., it was possible to recover approximately 90% of the strontium which was fixed.

After regeneration of the exchanger by 6 N $HNO_3$, a second fixation which was performed at 60° C. with the same throughput made it possible to fix a further 2.6 mg./g. of strontium.

No alteration of the exchanger became apparent during the different operations described.

The results obtained during tests comprising a number

It has been found that, when elution is performed at a temperature which is higher than the fixation temperature, the exchanger exhibits a resistance to repeated cycles and can be eluted in its entirety.

Example 2

The processed fission product solution is the same as in Example 1.

Antimonic acid has the following properties:

| Apparent density | g./ml | 1 |
|---|---|---|
| Maximum capacity | meq./g | 5 |
| Maximum capacity in a 2 N acid medium | meq./g | 1.0 |
| Useful capacity in an acid solution of fission products | meq./g | 0.05 |

The characteristics of the column were:

| Height of column | cm | 13 |
|---|---|---|
| Cross-sectional area | cm.² | 0.785 |
| Weight | grs | 10 |

A maximum strontium fixation of 4.5 mg./g. was obtained with a throughput of 1 volume of column per hour and at a temperature of 60° C.

After washing of the column with 2 N $HNO_3$, elution of Sr was performed with 0.5 M $AgNO_3$ in 2 N $HNO_3$ at 60° C. Under these conditions, 90% of the fixed strontium were recovered.

After regeneration of the exchanger with 6 N $HNO_3$, a second fixation made it possible to fix under the same conditions a further quantity of 1.38 mg. of strontium per gram of exchanger.

The results are recorded in Table II hereunder in the case of three successive fixation-elution cycles and a fourth fixation process.

TABLE II

| Cycle | 1 | 2 | 3 | 4 |
|---|---|---|---|---|
| Fixation: | | | | |
| Throughput—Volumes of column per hour | 0.8 | 0.81 | 0.8 | 0.84 |
| Volume passed—Volumes of column | 92.2 | 18.9 | 19.4 | 78.2 |
| Sr fixed, mg./ml | 4.58 | 1.38 | 1.11 | 1.54 |
| Sr total, mg./ml | 4.58 | 1.80 | 1.11 | 1.54 |
| Elution: | | | | |
| Throughput—Volumes of column per hour | 0.73 | 0.77 | 0.72 | |
| Volume passed—Volumes of column | 49.8 | 15.5 | 13.7 | |
| Sr eluted/Sr fixed, percent | 89.2 | 92 | 89.5 | |
| Sr eluted/Sr total, percent | 89.2 | 70.8 | 89.5 | |

Example 3

This is an example of a static test.
The initial solution of fission products had the following composition:

| | G./l. |
|---|---|
| Al | 16 |
| Fe | 8 |
| Mg | 4 |
| Na | 2 |
| Cr | 0.5 |
| Ni | 0.8 |
| U | 0.16 |
| Ca | 0.5 |
| $NH_4^+$ | 0.3 |
| Sr | 2.3 |
| Ce | 5 |
| La | 1.6 |
| Nd | 5.6 |
| Ba | 2 |
| Rb | 0.7 |
| Mo | 4.4 |
| Ru | 2.4 |

The free $H^+$ acidity was 2 N in $HNO_3$.

The polyantimonic acid employed had the following properties:

| | | |
|---|---|---|
| Apparent density | g./ml. | 1 |
| Maximum capacity | meq./g. | 5 |
| Maximum capacity in a 2 N acid medium | meq./g. | 1.0 |
| Useful capacity in an acid solution of fission products | meq./g. | 17 |

If 20 ml. of liquid are processed by contacting this volume with 1 g. of exchanger, the fixation capacity at equilibrium is 17 mg. of Sr per gram of exchanger.

By way of comparison, in the case of the products of the second example, but under the same operating conditions as have been noted above, the fixation capacity is 1 mg. Sr per gram of exchanger.

Elution can be performed under the same conditions as in Example 1 or 2.

Example 4

Static tests have been performed in connection with displacements of strontium by lead.

A weight of 1 g. of antimonic acid was employed as exchanger. The antimonic acid was contacted for a period of 24 hours with 20 ml. of a fission product solution which was identical with the solution of Example 1 and fixed 0.71 mg. of strontium.

The exchanger was then reprocessed with 20 ml. of a lead nitrate solution for a period of 24 hours. The quantities of strontium which were liberated with respect to the strontium which was initially fixed are, as a function of the concentration of the elution solution employed:

12.6% for a 0.1 M lead nitrate solution
44.5% for a 0.1 M solution in 2 N $HNO_3$
91.5% for a 0.5 M lead nitrate solution
96.5% for a 0.5 M solution in 2 N $HNO_3$ The regeneration of the exchanger by means of nitric acid gave the following results:

10 volumes of column of 2 N $HNO_3$ regenerated the exchanger in a proportion of 60% of its capacity;
10 additional volumes of 4 N $HNO_3$ made it possible to regenerate the exchanger in a proportion of 70%;
12 additional volumes of 6 N $HNO_3$ made it possible to attain a regeneration factor of 75%.

By way of comparison, if the regeneration is effected after elution with silver nitrate, the operation must be performed in a medium which has a higher acidity and with 50 volumes of column 6 N $HNO_3$, the exchanger is regenerated only up to 77%.

What we claim is:

1. A process for separating strontium values from an acid solution of fission products comprising a first step of contacting said solution with an ion exchanger consisting of antimonic acid and a second step of eluting the strontium values which are fixed on the antimonic acid with a solution containing a cation which has a greater affinity for antimonic acid than strontium, said cation being selected from the group comprising lead and silver.

2. A process according to claim 1, wherein elution is performed by means of a silver nitrate solution having an acidity within the range of 1 to 3 N and preferably of the order of 2 N.

3. A process according to claim 1, wherein elution is performed by means of a silver nitrate solution having an acid concentration within the range of 0.05 M to 1 M and preferably 0.1 M to 0.5 M.

4. A process according to claim 1, wherein elution is performed by means of a lead nitrate solution having an acid concentration within the range of 0 to 3 N and preferably of the order of 2 N.

5. A process according to claim 1, wherein elution is performed by means of a lead nitrate solution having a concentration within the range of 0.05 M to 1 M and preferably 0.1 M to 0.5 M.

References Cited

UNITED STATES PATENTS 3,287,084 11/1966 Van Tuyl _____ 252—301.1 X

OTHER REFERENCES

Nuclear Science Abstracts, vol. 18, No. 22; NSA-39374; Nov. 30, 1964.

BENJAMIN R. PADGETT, *Primary Examiner.*

S. J. LECHERT, JR., *Assistant Examiner.*